United States Patent
Wong

(10) Patent No.: US 9,345,364 B2
(45) Date of Patent: May 24, 2016

(54) FOOD WHISK

(71) Applicant: King's Flair Development Ltd., Hong Kong (HK)

(72) Inventor: Siu Wah Wong, Hong Kong (HK)

(73) Assignee: King's Flair Development Ltd., Hong Kong (HK)

( * ) Notice: Subject to any disclaimer, the term of this patent is extended or adjusted under 35 U.S.C. 154(b) by 124 days.

(21) Appl. No.: 14/245,362

(22) Filed: Apr. 4, 2014

(65) Prior Publication Data

US 2015/0282674 A1      Oct. 8, 2015

(51) Int. Cl.
*A47J 43/10* (2006.01)
*B01F 7/00* (2006.01)
*B01F 13/00* (2006.01)
*B01F 15/00* (2006.01)

(52) U.S. Cl.
CPC ......... *A47J 43/1087* (2013.01); *B01F 7/00058* (2013.01); *B01F 7/00583* (2013.01); *B01F 13/002* (2013.01); *B01F 15/00006* (2013.01); *B01F 15/00519* (2013.01)

(58) Field of Classification Search
CPC .................................................. A47J 43/1087
USPC ................... 366/129, 308, 343; 416/70 R, 72
See application file for complete search history.

(56) References Cited

U.S. PATENT DOCUMENTS

| | | | | |
|---|---|---|---|---|
| 26,958 A * | 1/1860 | Walker | ..................... | F16H 19/04 366/129 |
| 843,461 A * | 2/1907 | Husser | ................... | B63H 16/04 366/129 |
| 931,100 A * | 8/1909 | Valy | ..................... | A47J 43/1093 416/70 R |
| 944,781 A * | 12/1909 | Gienandt | ............ | A47J 43/1093 366/130 |
| 1,195,839 A * | 8/1916 | Moses | ................. | A47J 43/1093 366/129 |
| 1,210,192 A * | 12/1916 | Moses | ................. | A47J 43/1093 366/129 |
| 1,410,522 A * | 3/1922 | Ziemba | ............... | A47J 43/1093 366/129 |
| 1,960,089 A * | 5/1934 | Rabb | .................... | A47J 43/1068 15/120.2 |
| 1,996,240 A * | 4/1935 | Glenny | ............... | A47J 43/1093 366/129 |
| 2,092,353 A * | 9/1937 | Kyseth | .................... | A47J 43/27 366/343 |
| 2,208,337 A * | 7/1940 | Maslow | ........................ | 366/343 |
| 2,499,074 A * | 2/1950 | Nordgarden | ........ | A47J 43/1093 16/110.1 |
| 2,670,938 A * | 3/1954 | Wittmann | ........... | A47J 43/1068 366/325.6 |
| 6,206,561 B1 * | 3/2001 | Hefti | .................... | A47J 43/1093 366/129 |
| 7,740,397 B2 * | 6/2010 | Cheung | ............... | A47J 43/1093 366/129 |
| 8,226,539 B2 * | 7/2012 | Cutrer | .................. | A61N 5/1015 600/3 |
| 2013/0044560 A1 * | 2/2013 | Ho | ....................... | A47J 43/1093 366/129 |
| 2015/0257603 A1 * | 9/2015 | Lee | ..................... | A47J 43/1093 366/129 |

* cited by examiner

*Primary Examiner* — David Sorkin
*Assistant Examiner* — Abbas Rashid
(74) *Attorney, Agent, or Firm* — Wendy K. Marsh

(57) ABSTRACT

The present invention relates to a whisk comprising a whisk member, which whisk member is transformable between an expanded spiral configuration, which is suitable to be used in a deep container, and a substantially flat configuration, which is suitable to be used in a shallow container.

11 Claims, 4 Drawing Sheets

FOOD WHISK

TECHNICAL FIELD OF THE INVENTION

This invention relates generally to a whisk, and particularly, to a whisk that is transformable between two configurations.

BACKGROUND OF THE INVENTION

Currently available whisks, for example, for whisking eggs, typically comprise a handle and an oval-shaped whisk member. The whisk member is usually constituted by a plurality of wires, for example steel wires, extending from the handle and curved to form the oval shape of the whisk member. Because of the oval shape of the whisk member, these whisks are only suitable for whisking foods (for example, eggs or sauces) in a container with a relatively large depth (for example, a saucepan or a bowl), but not in a relatively shallow container (for example, a plate or a frypan). For whisking the foods in a shallow container, a whisk with a whisk member of substantially flat configuration is needed.

Furthermore, if these two types of whisks could be provided as a single one whisk, it would find a wide range of applications in kitchens, and the cost for kitchen tools as well as the space required for storage would be significantly reduced.

SUMMARY OF THE INVENTION

The present invention has a principle object of providing a whisk that can be used both in a deep container and in a shallow container. More particularly, the present invention aims to provide a whisk comprising a whisk member that is transformable between a substantially flat configuration and an expanded spiral configuration. When the whisk of the present invention needs to be used in a deep container, the whisk member is transformed into an expanded spiral configuration having a spherical profile; when the whisk is to be used in a shallow container, the whisk member is transformed into a substantially flat configuration.

These and other objects are satisfied by the present invention, which provides a whisk, comprising a handle having a cavity, a slider mechanism adapted to be slidably disposed within the cavity, and a whisk body. The whisk body comprises a whisk member having a proximal end and a distal end; a fixed leg extending from the proximal end in a sliding direction of the slider mechanism to the handle and secured to the handle; and at least one sliding leg extending from the distal end in the sliding direction of the slider mechanism to the slider mechanism. The sliding leg is secured to the slider mechanism so that the slider mechanism is slidably movable together with the sliding leg and the distal end of the whisk member. The whisk member is configured to be constrained to a substantially flat configuration when the slider mechanism is moved up to a locked position thereof on the handle, and configured to expand to an expanded spiral configuration when the slider mechanism is moved down to a unlocked position thereof on the handle. The spiral configuration may be of spherical configuration.

The handler may comprise an upper portion and a lower portion, through both of which the cavity and the guiding slots extend to allow the slider mechanism to move therein; the locked position is positioned on the upper portion, and the unlocked position is positioned on the lower portion. Preferably, the lower portion has a bottom member comprising a bottom plate provided with respective notches for allowing the fixed leg and the sliding leg to pass therethrough into the cavity of the handle, and a protruding portion extending upward from the bottom plate to define a passage with a lateral member extending from an inner wall of the lower portion so as to receive and secure a hooked end of the fixed leg in the passage.

In one preferred embodiment of the present invention, the slider mechanism comprises a slider plate configured to be slidably movable within the cavity of the handle; a pair of upwardly extended resilient arms extending from opposite sides of the slider plate; and a pair of locking tabs formed on the respective resilient arms. The locking tabs are configured to engage with respective apertures formed on the handle for locking the slider mechanism on the locked position, and to disengage from the respective apertures of the handle when they are pressed towards each other, thereby to allow the movement of the slider mechanism within the cavity of the handle. The handle may be formed with opposite internal guiding slots for guiding the movement of the slider mechanism within the cavity, and the slider plate is guided to move within the cavity of the handle in the guiding slots.

Advantageously, the sliding leg has a hooked end which is received in a transverse bore formed on one of the resilient arms of the slider mechanism, and a pin is provided to secure the hooked end of the sliding leg in the transverse bore.

The whisking member of the whisk according to the present invention may be made of a resilient material, preferably selected from metal, more preferably stainless steel, or plastics.

DETAILED DESCRIPTION OF THE INVENTION

While this invention is illustrated and described in preferred embodiments, the whisk of the present invention may be produced in many different configurations, sizes, forms and materials.

Figure 1:
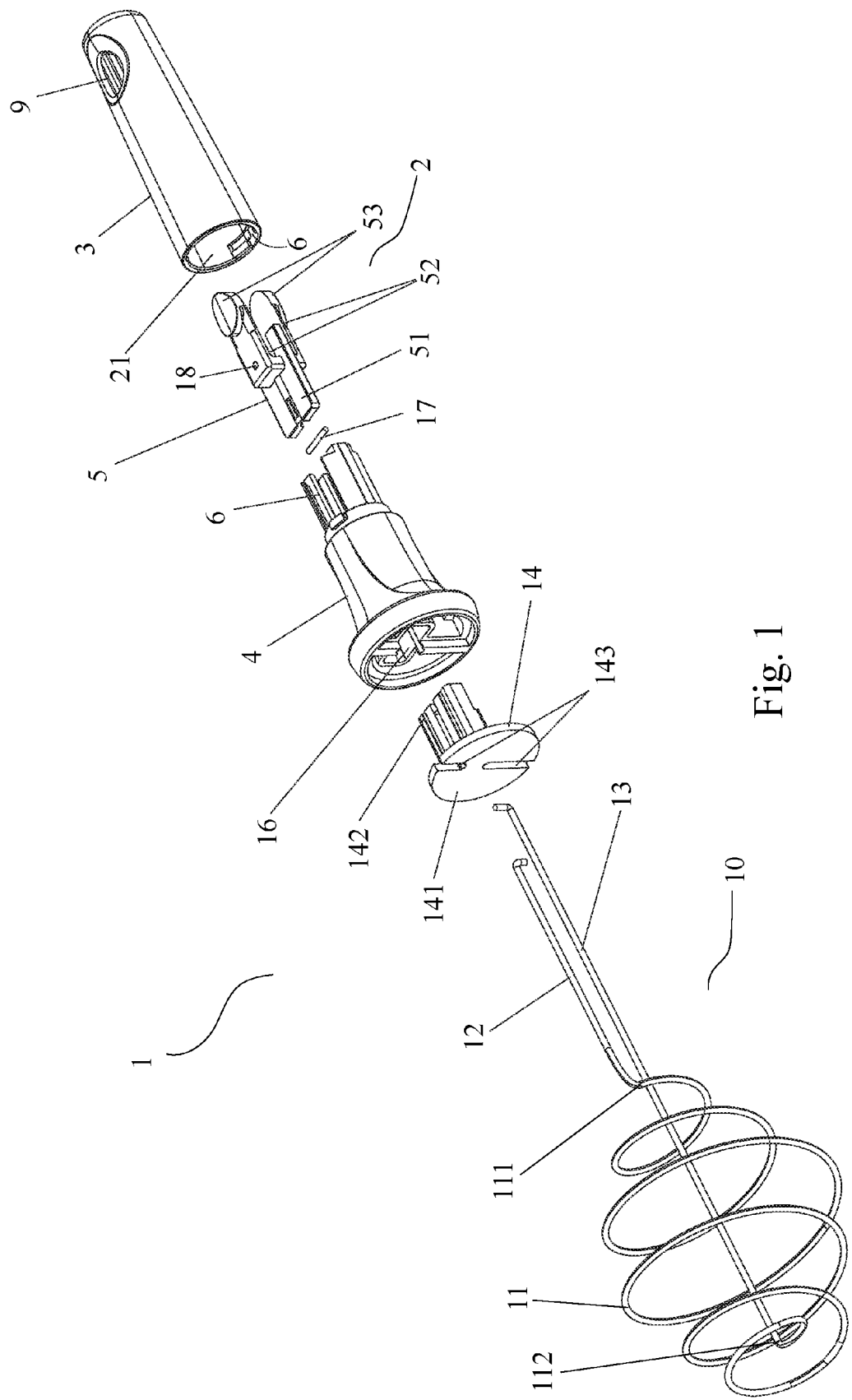
FIG. 1 is an exploded perspective view of a whisk constructed according to an embodiment of the present invention.

Referring now to the drawings, FIG. 1 illustrates in an exploded perspective view of a whisk according to a preferred embodiment of the present invention. The whisk 1 comprises a handle 2, a slider mechanism 5 and a whisk body 10.

The handle 2 comprises an upper portion 3 and a lower portion 4 detabably connected to the upper portion 3. The lower portion 4 may be detabably connected to the upper portion 3 by any method known in the art, for example using snap fit or screws. The handle 2 is of a substantially cylindrical shape and has a cavity 21 which extends through both the upper portion 3 and the lower portion 4, and the slider mechanism 5 is slidably disposed within the cavity 21. Those skilled in the art will understand that the handle 2 can also be of another shape, such as a rectangular shape. A pair of opposite internal guiding slots 6 for guiding the movement of the slider mechanism 5 are formed on opposite inner walls of the cavity 21. The upper portion 3 has a pair of opposite apertures 9 for engaging with the slider mechanism 5, which will be discussed hereinbelow.

The whisk body 10 comprises a whisk member 11, a fixed leg 12 and a sliding leg 13. The whisk member 11 is made of a resilient material such as metal or plastics to enable the whisk member 11 to expand or be compressed. Preferably, the whisk member 11 is made of stainless steel. The whisk member 11 has a proximal end 111 and a distal end 112. The fixed leg 12 extends from the proximal end 111 in a sliding direction of the slider mechanism 5 to the handle 2, and the sliding leg 13 extends from the distal end 112 in the sliding direction of the slider mechanism 5 to the slider mechanism 5. In this embodiment, the whisk member 11 is configured to have two different configurations, i.e. a spiral configuration and preferably a spherical profile, and a substantially flat configuration. As discussed above, because of the resilient nature of the material used, the whisk member 11 is switchable between the two configurations.

Figure 2:
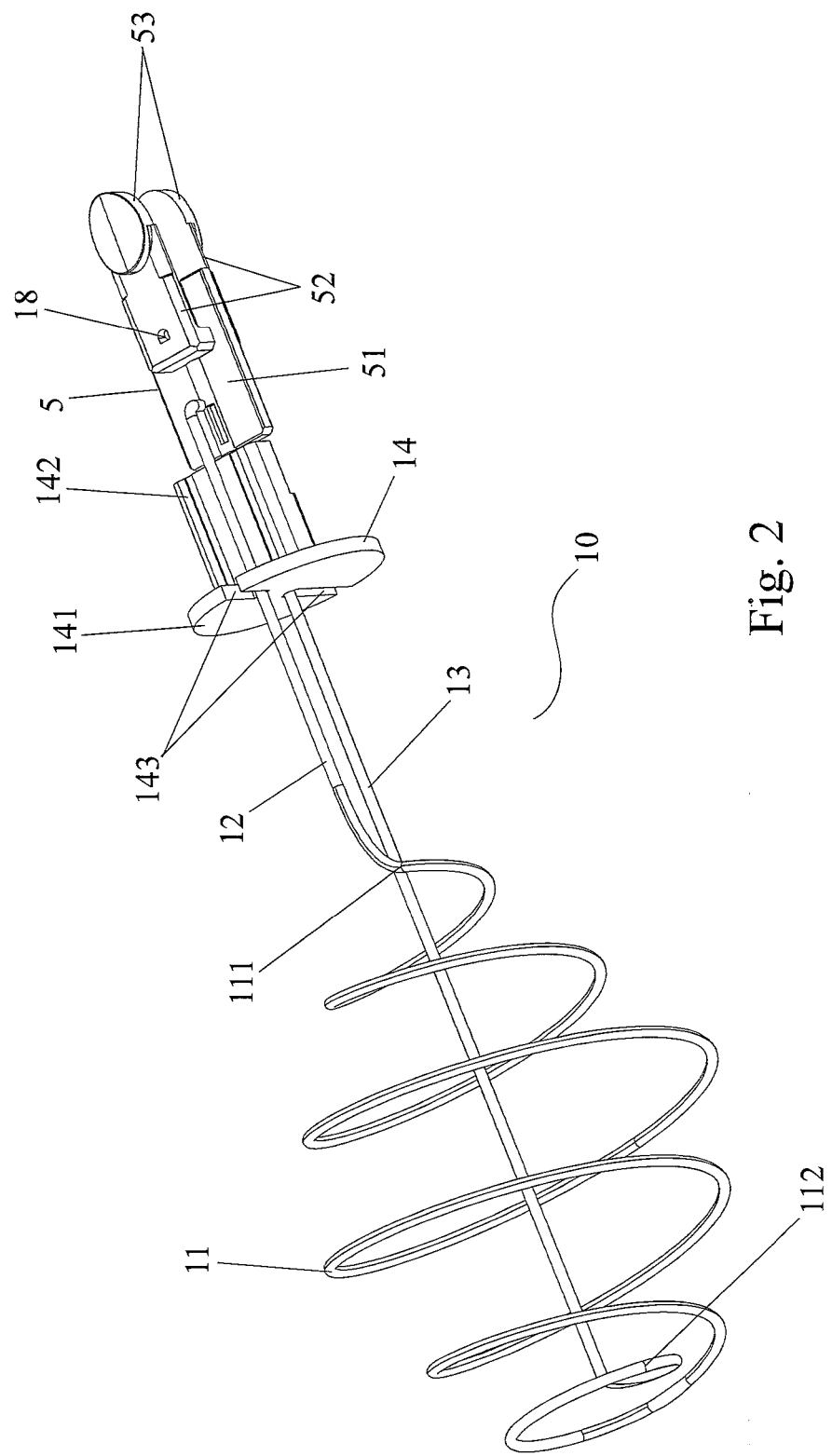
FIG. 2 is a perspective view of the whisk shown in FIG. 1 with the handle being removed.

As shown in FIGS. 1 and 2, the slider mechanism 5 comprises a slider plate 51 configured to be slidably movable along the opposite guiding slots 6 within the cavity 21 of the handle 2. The slider plate 51 is of a rectangular shape, and the guiding slots 6 are formed correspondingly to receive the respective edge portions of the slider plate 51. A pair of upwardly extended resilient arms 52 extend from front and back sides of the slider plate 51, and a pair of locking tabs 53 are formed on the respective resilient arms 52. The locking tabs 53 are configured to engage with the respective apertures 9 formed on the upper portion 3 of the handle 2, thereby locking the slider mechanism 5 on the upper portion of the handle 2. When the two locking tabs 53 are pressed by for example fingers of a user, the locking tabs 53 formed on the resilient arms 52 would move towards each other and move into the cavity 21 of the handler, so that the locking tabs 53 disengage from the respective apertures 9 of the handle 2, thereby to allow the downward movement of the slider mechanism 5 within the cavity 21 of the handle 2. When the tabs 53 of the slider mechanism 5 moves up to reach the apertures 9 of the handle 2, the compressed resilient arms 52 would allow the tabs 53 to go into the apertures 9 and engage with the apertures 9 where the slider mechanism is locked.

As shown in FIG. 1, the locking tabs 53 take an oval shape, and the apertures 9 are shaped accordingly so as to receive the locking tabs 53. Those skilled in the art will understand that the shape of the locking tabs 53 and the apertures 9 can be of any shape as long as the locking tabs 53 can be received in the apertures 9.

The lower portion 4 further comprises a bottom member 14. As shown in FIG. 2, the bottom member 14 of the lower portion 4 comprises a bottom plate 141 provided with two respective notches 143 for allowing the fixed leg 12 and the sliding leg 13 to pass therethrough into the cavity 21 of the handle 2, and a protruding portion 142 extending upward from the bottom plate 141 to define a passage with a lateral member (not shown) extending from an inner wall of the lower portion 4 so as to receive and secure a hooked end of the fixed leg 12 in the passage. Those skilled in the art will understand that the fixed leg 12 may also be secured to the handle 2 using any suitable methods. A hollow portion 16 is formed in the lower portion 4 for receiving the protruding portion 142. The sliding leg 13 also has a hooked end, which is received in a transverse bore 18 formed on one of the resilient arms 52 of the slider mechanism 5. The sliding leg 13 may be secured to the slider mechanism 5 in any manner known in the art.

Figure 3:
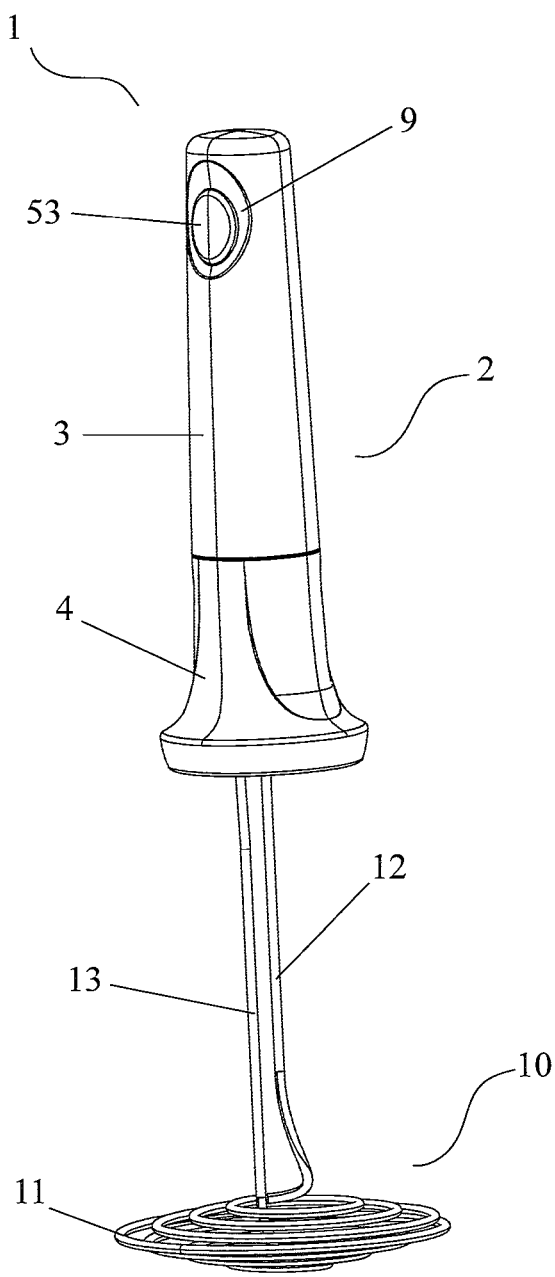
FIG. 3 is a perspective view of the whisk shown in FIG. 1 with a whisk member thereof in a substantially flat configuration.

Referring now to FIG. 3 which illustrates the whisk 1 is in the substantially flat configuration suitable to be used in a shallow container, the user applies an upward force to the lower end of the whisk member 11, for example, by holding the handle 2 and pressing the lower end of the whisk member 11 against a table surface, forcing the sliding leg 13 and the slider mechanism 5 to slide upwardly until the locking tabs 53 reach the apertures 9 and move into the apertures 9 by the resilient force of the resilient arms 52, thereby engaging with the apertures 9. As a result, the slider mechanism 5 is locked in the locked position on the upper portion 3. As the fixed leg 12 is secured to the handle 2 while the sliding leg 13 slides upwardly with respect to the handle 2, the distance between the proximal end and the distal end of the whisk member 11 is reduced until the tabs 53 engage with the apertures 9 where the whisk member 11 is constrained to a substantially flat configuration, which is suitable to be used in a shallow container and also may be used as a sauce blender.

Figure 4:
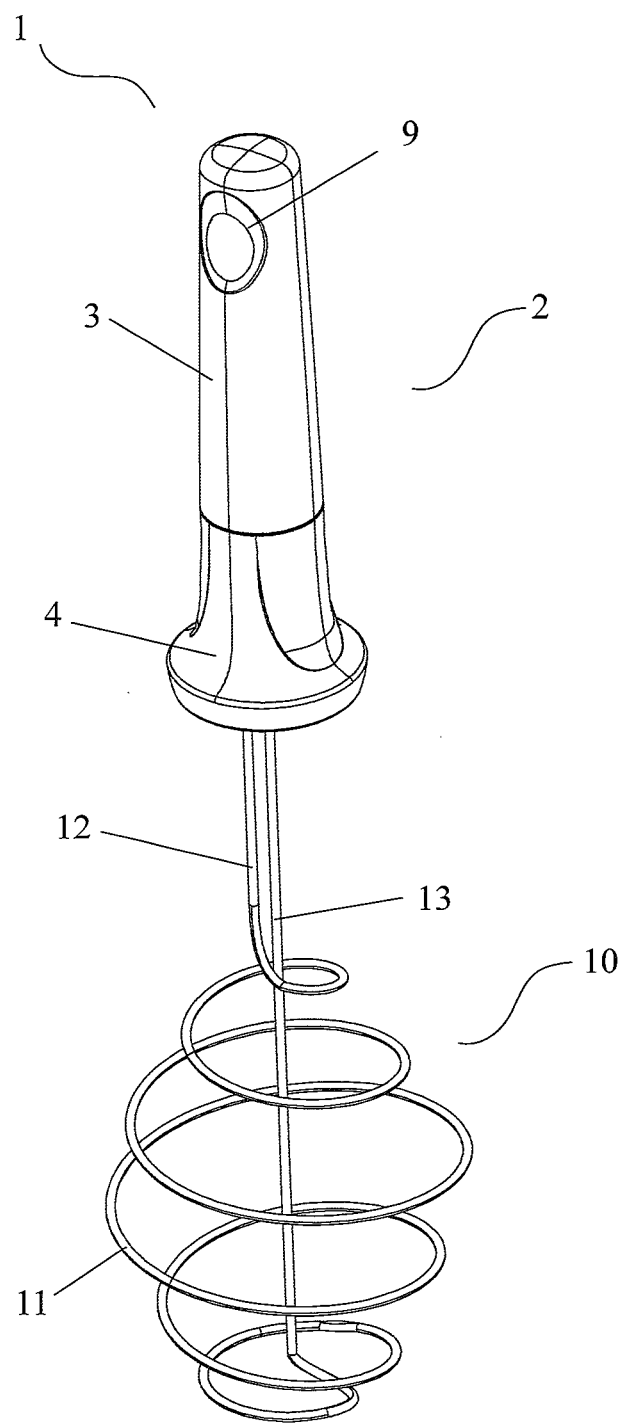
FIG. 4 is a perspective view of the whisk shown in FIG. 1 with the whisk member in an expanded spiral configuration.

Referring now to FIG. 4 which illustrates the whisk 1 is in the expanded spiral configuration suitable to be used in a relatively deep container, the user presses the locking tabs 53 towards each other so as to disengage them from the apertures 9, allowing the downward movement of the slider mechanism 5 within the cavity 21 of the handle 2 to the unlocked position in the lower portion 4 of the handle 2. As a result of the resilient characteristics, the whisk member is expanded into an expanded spiral configuration. Preferably, the spiral configuration is of spherical configuration, which provides more contact surface with the foods to be whisked. The expanded spherical configuration is especially suitable to be used in a deep container to achieve better whisking effects.

While the present invention is described in connection with what is presently considered to be the most practical and preferred embodiment, it should be appreciated that the invention is not limited to the disclosed embodiment, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1 whisk
2 handle
3 upper portion
4 lower portion
5 slider mechanism
6 guiding slot
9 aperture
10 whisk body
11 whisk member
12 fixed leg
13 sliding leg
14 bottom member
16 hollow portion
18 bore
21 cavity
51 slider plate
52 resilient arm
53 locking tab
141 bottom plate
142 protruding portion
143 notch

What is claimed is:

1. A whisk (1), comprising:
a handle (2) having a cavity (21);
a slider mechanism (5) adapted to be slidably disposed within the cavity (21); and
a whisk body (10) comprising:
  a whisk member (11) having a proximal end and a distal end,
  a fixed leg (12) extending from the proximal end in a sliding direction of the slider mechanism (5) to the handle (2) and secured to the handle, and
  at least one sliding leg (13) extending from the distal end in the sliding direction of the slider mechanism (5) to the slider mechanism (5), said sliding leg (13) being secured to the slider mechanism (5) so that the slider mechanism (5) is slidably movable with the sliding leg (13) and the distal end of the whisk member (11), wherein the whisk member (11) is configured to be constrained to a substantially flat configuration in a plane perpendicular to a longitudinal direction of the whisk when the slider mechanism (5) is moved up to a locked position thereof on the handle (2), and configured to expand in the longitudinal direction of the whisk to an expanded spiral configuration when the slider mechanism (5) is moved down to an unlocked position thereof on the handle (2).

2. The whisk (1) of claim 1, wherein the handle (2) is formed with opposite internal guiding slots (6) for guiding the movement of the slider mechanism (5) within the cavity (21).

3. The whisk (1) of claim 2, wherein the handle (2) comprises an upper portion (3) and a lower portion (4), through both of which the cavity (21) and the guiding slots (6) extend to allow the slider mechanism (5) to move therein; and the locked position is positioned on the upper portion (3), and the unlocked position is positioned on the lower portion (4).

4. The whisk (1) of claim 3, wherein the lower portion (4) has a bottom member (14) comprising a bottom plate (141) provided with respective notches (143) for allowing the fixed leg (12) and the sliding leg (13) to pass therethrough into the cavity (21) of the handle (2), and a protruding portion (142) extending upward from the bottom plate (141) to define a passage with a lateral member extending from an inner wall of the lower portion (4) so as to receive and secure a hooked end of the fixed leg (12) in the passage.

5. The whisk (1) of claim 1, wherein the slider mechanism (5) comprises a slider plate (51) configured to be slidably movable within the cavity (21) of the handle (2), a pair of upwardly extended resilient arms (52) extending from opposite sides of the slider plate (51), and a pair of locking tabs (53) formed on the respective resilient arms (52), wherein the locking tabs (53) are configured to engage with respective apertures (9) formed on the handle (2) for locking the slider mechanism (5) on the locked position, and to disengage from the respective apertures (9) of the handle (2) when they are pressed towards each other, thereby to allow the movement of the slider mechanism (5) within the cavity (21) of the handle (2).

6. The whisk (1) of claim 5, wherein the sliding leg (13) has a hooked end which is received in a transverse bore (18) formed on one of the resilient arms (52) of the slider mechanism (5), and a pin (17) is provided to secure the hooked end of the sliding leg (13) in the transverse bore (18).

7. The whisk (1) of claim 5, wherein the handle (2) is formed with opposite internal guiding slots (6) for guiding the movement of the slider mechanism (5) within the cavity (21), and the slider plate (51) is guided to move within the cavity (21) of the handle (2) in the guiding slots (6).

8. The whisk (1) of claim 1, wherein the whisking member (10) is made of resilient material.

9. The whisk (1) of claim 8, wherein the resilient material is selected from metal or plastics.

10. The whisk (1) of claim 1, wherein the spiral configuration is of spherical configuration.

11. The whisk (1) of claim 8, wherein the resilient material is stainless steel.

* * * * *